March 24, 1936.    J. C. OLSEN    2,034,828
BELT FASTENER
Filed March 9, 1935
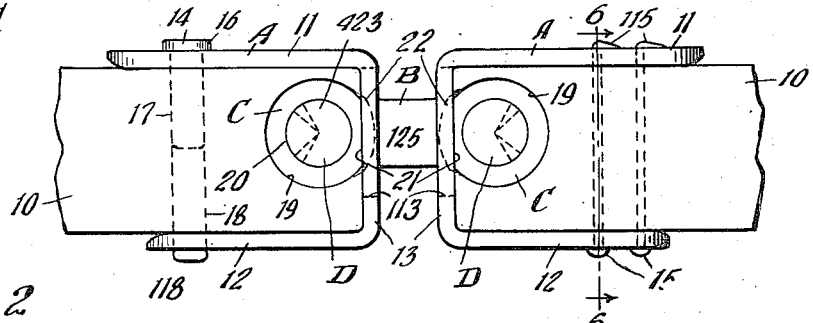
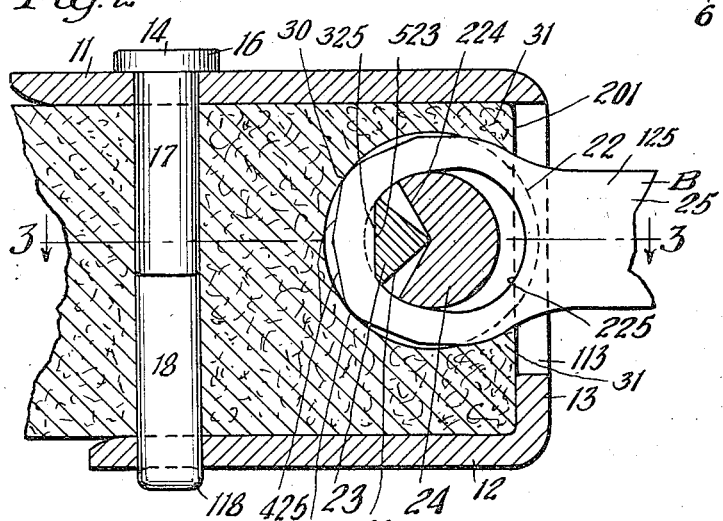
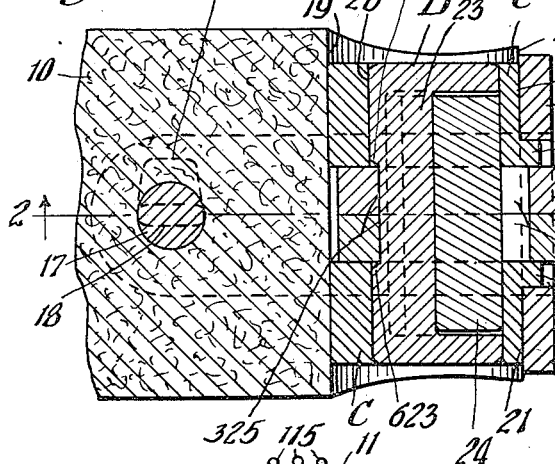
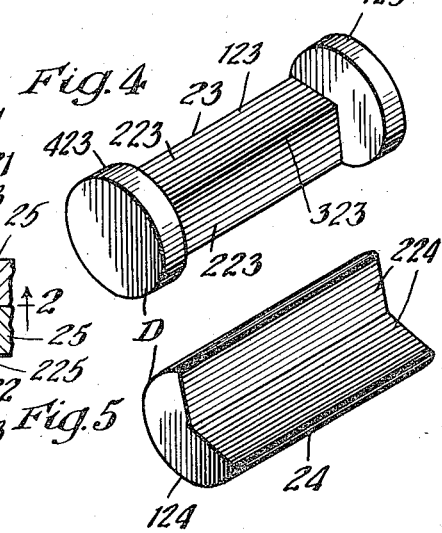
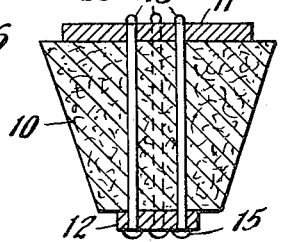
Inventor
John C. Olsen
By Joseph Harris
his Atty.

Patented Mar. 24, 1936

2,034,828

UNITED STATES PATENT OFFICE 2,034,828

BELT FASTENER

John C. Olsen, Chicago, Ill., assignor to Flexible Steel Lacing Company, Chicago, Ill., a corporation of Illinois Application March 9, 1935, Serial No. 10,264

8 Claims. (Cl. 24—33)

This invention relates to improvements in belt fastener and more specifically is in the nature of an improvement upon that type of belt fastener disclosed in my prior Patent 1,989,147 granted January 29, 1935.

The belt fastener disclosed in said prior patent is designed primarily for connecting the ends of V-belts and, broadly, consists of two bail-like members, each secured to an end of the belt; a single link connection extended through apertures in the bail members; and sectional rocker pins extended transversely through openings in the ends of the link, each rocker pin in turn being journalled in bearing members. More specifically, the belt fastener of the type shown in said prior patent, is characterized by the fact that the rocker pins, bearing members and ends of the link are all confined within the resilient material comprising the belt.

One of the uses to which belt fasteners of the character indicated is put, is in connection with the belt drives for generator sets of railway cars where the generators are located beneath the car body and only a short distance above the road-bed. The conditions under which such belt drives are required to operate, are extremely severe due to the fact that the cars are run in all kinds of weather and foreign matter is continuously being thrown up against the generator belts when the cars are in motion, with the result that there is a constant tendency for foreign matter to penetrate into the working parts of the belt fastener with consequent danger of destructive effect and excessively rapid wear of the moving parts.

One object of the present invention is to provide a belt fastener, and more particularly one for V-belt drives, wherein the construction is such as to reduce to a minimum the possibility of any dust, grit or other foreign matter entering within the working relatively movable parts of the flexible fastener, to the end that the life of the fastener may thereby be materially prolonged.

Another object of the invention is to provide a fastener of the flexible rocker pin type particularly adapted for V-belts wherein the cost of manufacture of the parts, more particularly the rocker pins, is reduced by so constructing one of the parts of the rocker pin that the same may be made from extruded stock cut to requisite length.

Other objects of the invention are to provide in a flexible fastener of the type hereinbefore indicated; an improved link connection extending between the rocker pins such that the link connection may be manufactured at less expense than heretofore; to provide an improved link construction such that the insertion and removal of the rocker pins employed in the fastener is greatly facilitated; and also to improve the means of attachment of the fastening members proper to the belt ends.

Other objects of the invention will more clearly appear from the description and claims hereinafter following.

In the drawing forming a part of this specification, Figure 1 is a side elevational view of the adjacent ends of a V-belt showing the improvements incorporated therewith. Figure 2 is an enlarged vertical sectional view corresponding substantially to the line 2—2 of Figure 3. Figure 3 is a horizontal sectional view corresponding to the section line 3—3 of Figure 2. Figures 4 and 5 are detailed perspective views of the two elements comprising the sectional rocker pin. And Figure 6 is a vertical transverse sectional view corresponding to the section line 6—6 of Figure 1.

In said drawing, 10—10 indicate the respective ends of a V-belt to be connected by the improved fastener, said V-belt being ordinarily comprised of a resilient composition of rubber and fabric and of such cross section, as shown in Figure 6 that the outer side is materially wider than the inner side, said outer and inner sides being united by the inwardly converged side driving surfaces for cooperation with grooved pulleys, as customary. The improved fastener comprises, broadly, two attaching members proper A—A; connecting link means B extending therebetween; bearing elements C—C in the belt ends; and sectional rocker pins designated generally by the reference character D.

Each of the attaching members A is preferably in the form of a U-shaped member or bail having an upper arm 11, lower arm 12 and connecting bight 13, all of which portions snugly engage the respective outer, inner and end faces of the belt end, as best shown in Figure 2. As shown in Figure 6, the upper and lower arms 11 and 12 will each be slightly less in width than the corresponding respective outer and inner sides of the belt so as to eliminate any possibility of the metal attaching bail coming into contact with the grooved faces of the pulleys.

The attaching members are in turn staunchly connected to the respective belt ends either by a single relatively heavy pin as indicated at 14 or a plurality of nails 15—15. Where a single heavy pin 14 is employed, the same preferably consists of a headed end 16, adjacent cylindrical shank 17 extending only partially through the belt and a flattened shank section 18 forming a continuation of the cylindrical section 17 and passing through the remainder of the belt and the lower arm 12 of the bail as shown. The reduced relatively flattened shank section 18 is elongated in the direction of length of the belt and narrow transversely thereof and provided with forward and rear rounded edges. The pin 14 is entered through a suitable cylindrical opening in the outer arm 11 of the attaching member A and the reduced flattened shank section 18 through an opening of corresponding contour in the lower arm 12, the free end of the pin shank then being turned over as by a hammer as indicated at 118 so as to prevent accidental removal of the pin. Preferably, the belt will be prepared for the reception of the pin 14 by boring partially through the belt for a distance corresponding to the cylindrical shank section 17 and slitting through the remainder of the belt to receive the flattened shank section 18. With the construction of pin shown and described, the heavier section of the shank is obviously within the wider portion of the belt so that danger of "swelling" the belt is reduced to a minimum while at the same time danger of disrupting the material comprising the belt is also reduced to a minimum.

In the case of the nails 15 for attaching the bails A, the same are entered through suitably aligned holes in the arms of the bail and may be driven through the belt material, preferably previously pierced for that purpose. Preferably also, three nails 15 will be employed arranged as shown so as to distribute the stress transmitted to the belt end over a widened area. The nails may be retained in position by hammering over their ends as indicated at 115.

In attaching the improved fastener to the belt ends, the ends of the belt are first prepared for the reception of the rocker pin connections, preferably in the manner shown in my co-pending application, Serial Number 7,486, filed February 21, 1935. In preparing the belt ends, each is bored laterally so as to provide an approximately complete cylindrical opening 19 extending transversely therethrough and the center of which will be substantially in line with the neutral axis of the belt. As shown in said application, the end of the belt will also be trimmed off square as indicated at 201 so as to accurately locate the bight of the bail attaching member with reference to the axis of the rocker pins. After the belt ends have been prepared and the bails A attached, the bearing members C are inserted through the aperture 113 provided in each bight. Each of said bearing members C is of general annular form with a true circular bearing 20. On its front side, each bearing member C is formed with a flattened surface 21 adapted to bear directly against the inner face of the corresponding bight. In external contour, each bearing member C will conform to the bore 19 in the belt so as to fit very snugly therewithin and be retained in normal position by reason of the resilient composition of the belt material although, as will be apparent, the bearing members may shift within reasonable limits slightly up and down on the inner face of the bight while at the same time maintaining sealed contact with the belt and bight, it being understood that the material of the belt end will accommodate itself sufficiently for this purpose. Each of the bearing members C is also provided with an outwardly extended lip 22 which, when the bearing members C are in place, is disposed within the bight opening 113. The length of the bearing member C is made such that each may be entered through the bight opening freely, one after the other and then shifted laterally outwardly and, when in position as shown in Figure 3, there will remain just sufficient clearance therebetween to snugly receive the link means B.

Each improved rocker pin D consists of two elements 23 and 24. Each element D the longer of the two, comprises an intermediate section 123 of sector cross section with an angle of approximately eighty degrees between the two radial faces 223—223, so as to provide a fulcruming knife edge 323 which, in practice, will be slightly rounded so as to avoid a too fine edge that might otherwise be worn down with excessive rapidity. At its ends the element 23 is provided with disklike flanges 423, the diameter of the latter corresponding to the diameter of the bearings 20 of the members C so that, when the element 23 of each rocker pin is in assembled position as shown in Figure 3, a seal is provided between it and the bearing members C so as to eliminate admission of any foreign matter endwise within the rocker pin bearing. The circular surface of the intermediate sector section 123 is on the same radius as that of the disk ends 423 except that, for a short distance centrally of the element 23, the sector section 123 has a flattened surface as indicated at 523 to provide a non-rockable engagement with the link means, as hereinafter described. Also, as clearly shown in Figure 3, said flattened section 523 results in the formation of end shoulders 623 for the purpose hereinafter described.

The other element 24 of each rocker pin, is of uniform cross section throughout, so that the same may be drawn and cut to suitable lengths. The cross section thereof is of somewhat crescent form with a cylindrical outer surface 124 and two converging radial surfaces 224—224. The angle between the surfaces 224 is appreciably larger than the angle between the surfaces 223 of the other element so as to allow of the necessary rocking action between the two elements. The length of each element 24 is such that the same may be entered snugly but without a friction fit, between the disk ends 423 of the element 23, as best shown in Figure 3. As will be evident, the cylindrical surfaces 124 of the element 24 also fit with the bearing members C and, because of the fact that the outer cylindrical surfaces of both elements 23 and 24 coincide with the bearing surfaces 20, the axis of rocking will be positively maintained and without danger of the two elements 23 and 24 becoming bodily displaced either circumferentially or longitudinally with respect to each other.

The link means B, as shown, preferably consists of two like link plates 25—25. Each of said link plates is made symmetrical with respect to both its horizontal and vertical central axes, as viewed in Figure 1 so that the link plates are reversible both end for end and when turned. The scale shown in Figures 2 and 3 of the drawing is approximately four times tha of actual size and, in practice, each link plate will preferably be approximately $\frac{3}{32}$ of an inch in thickness so that the same may be readily stamped in quantity to therefore reduce the cost of manufacture. Each link plate 25 consists of a central connecting section 125 and at each end is provided with an opening 225. The latter has a flat edge 325 cooperable with the flattened face 523 of the adjacent rocker pin element and is of irregular curved contour throughout its remainder and of a total over-all length slightly greater than the diameter of the combined rocker pin elements. Each end of the link plate, is somewhat enlarged as shown so as to provide for the opening 225 and at the same time leave sufficient metal to provide the necessary strength. The end of each link plate consists of a series of flat faces 425—425 such that, as viewed in Figure 2, the edge of the plate will only come into contact, normally, with the surface of the bore in the belt end, at the two points indicated at 30—30. Where the enlarged ends of the link plates are merged with the connecting section 125, the over-all width will be somewhat in excess of the side opening of the bore 19 so that the material of the belt will be somewhat crowded or compressed in those areas indicated approximately by the reference characters 31—31, thus insuring a seal with the link plates in all positions of the latter within the range of flexible movement of the fastener.

In assembling the fastener, after the bails A have been attached, the bearing members C are first put in position as previously described. The pair of link plates are then inserted endwise through the bights and between the respective pairs of bearing members C. It is then necessary to force the link plates endwise into the belt material a distance corresponding to the depth of the shoulders 623 and this action is greatly facilitated by reason of the fact that the outer contour of the link ends does not conform to the bore 19 but has only spaced contact therewith. Stated otherwise, the resilient material of the belt end will readily give way or compress as the link is pushed into the belt end the distance necessary to clear the shoulders 623 as the assembled rocker pin is finally inserted transversely through the bearing members C and the opening of the link. When the pin is in place, the link is released, thus seating the flattened faces of the link plates against the flat surface 523 of the pin element 23. In this latter condition, as shown in Figure 3, it is then impossible for the pin D to accidentally shift endwise.

From the preceding description, it will be seen that a complete seal is at all times effected between the various parts of the rocker-pin connection and belt end, thereby avoiding or at least reducing to the minimum the possibility of any dirt, grit or other foreign matter entering into the bearings between the rocker pin and bearing members C or between the two elements 23 and 24 of the rocker pin, and hence prolonging the life of the fastener.

In actual practice, the rocker pin elements will preferably be made from low carbon nickel steel suitably treated to harden the surfaces and render them proof against oxidation. The bearing members C preferably will be of a softer metal such as copper or copper alloy, and the bails and link plates preferably made of a high grade of steel.

Although the preferred form of the invention has herein been shown and described, the same is by way of illustration and not by way of limitation, all changes and modifications being contemplated that come within the scope of the claims appended hereto.

What is claimed is:—

1. In a fastener for the ends of a belt, the combination with members adapted to be attached to the respective belt ends and having apertured end sections positioned opposite and against the respective ends of the belt; of sectional rocker bearing pins located on the inner sides of said member end sections and within the belt ends, each said pin comprising two elements having complemental cooperable rocker bearing portions, one of said elements being of uniform cross section throughout its length; and connecting means extending through said apertured end sections and between said pins, said connecting means being angularly movable with respect to each of said members.

2. As an article of manufacture, a rocker pin for belt fasteners of link type, said rocker pin comprising: two elements each having exterior surfaces at their ends of a common radius, one element being longer than the other and having flanges at its ends overlying the ends of the shorter element to prevent relative axial shift therebetween, the shorter element being of uniform cross section throughout its length.

3. In a fastener for the ends of a belt, the combination with bail-like members attachable to the respective ends of the belt, the bight of each of said members being apertured; of a connector link extending through said apertures, said link having enlarged apertured ends and symmetrical with respect to both its longitudinal and transverse axes whereby the link is reversible in use; and means providing an adjustable connection between the respective ends of the link and the inner sides of the bight portions of said members, said means being disposed within the material of the belt ends.

4. In a V-belt fastener, the combination with two attaching members, each having upper and lower longitudinally extending arms and an apertured connecting end section; link connecting means extended through said apertures; detachable bearing elements on the inner side of each of said end sections; and means providing an adjustable connection between each end of said link means and corresponding set of bearing elements, said means comprising a sectional rocker pin journalled at its ends in the bearing elements, one element of each sectional rocker pin having circular ends snugly completely filling the corresponding openings of the bearing elements to thereby prevent admission of foreign matter.

5. As an article of manufacture, a rocker pin for belt fasteners of link type, said rocker pin comprising: one element having an intermediate portion of sector cross section and circular flange ends, said intermediate portion being provided with a flattened exterior face intermediate the ends thereof; and a cooperable element of a length to fit between said flanged ends and of cross section corresponding substantially to a cylinder with a removable sector of greater included angle than the included angle of the sector cross section of the first-named element.

6. In a belt fastener, an attaching member having portions thereof adapted to embrace the outer and inner surfaces of a belt end; and means for attaching said member to the belt end, said means comprising a pin extending through said embracing portions of the attaching member and the belt, said pin having a shank circular in cross section throughout a part of its length and, throughout the rest of its length of a cross section relatively thin in a direction transverse to the line of the belt and relatively elongated in a direction parallel to the line of the belt.

7. In a fastener of the character described, the combination with two belt ends of resilient material, each end being provided with a transversely extending bore; of a pair of attaching members secured to the respective belt ends at points inwardly of the bores; connecting pins disposed within each bore; and a link extending between the pins and having its ends disposed within the bores, the ends of the link being of external contour different from the cross sectional contour of the bores and such as to leave spaces between the link ends and the surfaces of the bores, whereby the ends of the link may be readily shifted endwise into the belt ends.

8. In a fastener for the ends of a belt comprised of resilient material and wherein the ends of the belt have transversely extending bores therein adjacent the extreme ends of the belt, the combination with a pair of bail attaching members each having an apertured bight and the arms of which are adapted to embrace the inner and outer faces of the belt end; of means for securing said bail members to the belt ends; a pair of laterally separated bearing members snugly fitted within the bore of each belt end; a sectional rocker pin journalled at its ends in each pair of bearing members, one element of each rocker pin having circular ends snugly fitting the bearing openings of the corresponding pair of bearing members to thereby provide a seal against entrance of foreign matter; and a pair of link plates extending through the bight openings and between the rocker pins, the combined width of the link plates corresponding to the distance between the pairs of bearing members and forming therewith a similar seal, the link plates having enlarged ends disposed within the bores of the belt ends and having snug engagement, adjacent the bights, with the surrounding material of the belt ends, said ends of the link plates being of irregular outer contour to normally provide spaces between the surfaces thereof and the adjacent surfaces of the belt end bores, each end of the link plates being apertured to receive a rocker pin therethrough, the link plates and one element of each rocker pin having non-rockable engagement and each said element also having shoulders cooperable with the link plates to prevent endwise shift of the rocker pins relative to the link plates.

JOHN C. OLSEN.